United States Patent [19]

Velan

[11] Patent Number: 5,685,520
[45] Date of Patent: Nov. 11, 1997

[54] BUTTERFLY VALVE

[75] Inventor: Adolf Karel Velan, Westmount, Canada

[73] Assignee: Velan, Inc., Quebec, Canada

[21] Appl. No.: 684,062

[22] Filed: Jul. 19, 1996

[30] Foreign Application Priority Data

May 21, 1996 [CA] Canada .................. 2177026

[51] Int. Cl.$^6$ .................................... F16K 1/22
[52] U.S. Cl. ............................ 251/306; 251/305
[58] Field of Search ......................... 251/305, 306

[56] References Cited

U.S. PATENT DOCUMENTS

| | | |
|---|---|---|
| 3,734,457 | 5/1973 | Roos . |
| 4,114,856 | 9/1978 | MacGfee et al. ............ 251/306 |
| 4,195,815 | 4/1980 | Stager . |
| 4,202,365 | 5/1980 | Aoki et al. . |
| 4,220,172 | 9/1980 | Stager . |
| 4,266,752 | 5/1981 | Johnson . |
| 4,272,054 | 6/1981 | Zinnai . |
| 4,331,319 | 5/1982 | Summers et al. .......... 251/306 X |
| 4,398,695 | 8/1983 | Torche . |
| 4,487,216 | 12/1984 | Barker et al. . |
| 4,491,298 | 1/1985 | Beauchamp et al. ......... 251/306 |
| 4,505,290 | 3/1985 | Scobie . |
| 4,513,946 | 4/1985 | Priese . |

FOREIGN PATENT DOCUMENTS 2605189 8/1976 Germany .................. 251/306

OTHER PUBLICATIONS

Evaluation of High Performance Butterfly Valves with Resilient Seats —Design Parameters (not published).

*Primary Examiner*—John Fox
*Attorney, Agent, or Firm*—Birch, Stewart, Kolasch & Birch, LLP

[57] ABSTRACT

A valve including an annular groove in the valve body at the periphery of the valve disc. A fire-safe seal provides a fluid seal between the valve disc and the valve passageway. A seal is disposed in the annular groove having an axial projection for retaining the seal and a sealing surface projecting radially inwardly in the passageway and being engageable by the peripheral edge of the valve disc. This sealing surface has an inverted resilient J-shaped portion. The seal also has a circumferential slot for receiving a metal ring to provide circumferential stability. A retaining ring having a blocking groove extends axially and inwardly thereof for receiving the distal end of the resilient J-shaped portion.

4 Claims, 2 Drawing Sheets

BUTTERFLY VALVE

BACKGROUND OF THE INVENTION

1. Field of the Invention

This invention relates generally to valves, and more particularly to high-pressure, high-temperature seal arrangements for a valve, such as a butterfly valve, having a pivotally mounted valving member.

2. Description of the Prior Art

Butterfly valves are used in large quantities for the control of water and gas flow, using a rubber seat against a metal disc. Generally, butterfly valves can be placed in two categories, namely, those high performance butterfly valves with seats made from Teflon or other resilient material and a metallic backup ring for fire-safe operation. These valves are usually bi-directional.

The other category is directed to metal-seated butterfly valves with zero leakage for severe service with advanced seat and disc design technology. The disc has a triple offset which results in a low-friction, torque-seating design which develops bi-directional, zero-leakage shut-off.

In general, stem seals, disc geometry, travel stops and most significantly the seat geometry and its method of retention will have an impact on valve performance and long term reliability.

Over the years, a number of seat designs have been introduced to improve valve performance and long term reliability. Some of these design features include the provision of resilient seats which provide the sealing contact with the disc and which are protected from flow by a recess in the body and retaining flange. Most of these have a metal support, and some are designed to seal better, after closing, with increasing line pressure. A fire-safe stainless backup seat is also provided.

One such well-known design is described in U.S. Pat. No. 3,734,457, Roos, issued May 22, 1973, which is commonly referred to as the DeZurik butterfly valve. In this design, the seat made of Teflon is supported by a titanium back-up hoop. As the disc closes, it expands the seat to provide a good seal. A titanium ring supports the seat and provides the elasticity required for tight shut-off. When the valve is closed, the pressure in the seat cavity forces the seat against the disc regardless which end of the valve is pressurized, providing bi-directional shut-off.

Another butterfly-type valve, known as the Jamesbury valve, is disclosed in U.S. Pat. No. 4,202,365, issued May 13, 1980. In this design, the seat is also pressure-energized bi-directional sealing and is offset from the center. The disc center is also offset from the center line to impart a camming action at closing and allows the disc to swing out completely when opening, eliminating wear at the top and bottom of the seat.

The seal arrangements disclosed in U.S. Pat. Nos. 4,266,752, issued May 12, 1981, and 4,398,695, issued Aug. 16, 1983, are known as the Mark Controls design. In these configurations, the seat is totally contained, and an encapsulated O-ring loads the seat against the seat cavity lips, preventing dirt from entering. When the disc is closed, line pressure enters the seat cavity and deflects a soft seat to one side. During the deformation, a force is created by the poisson effect in the only unconfined direction, providing an additional tightening force. One of the problems associated with this design is that it does not make use of pressure to assist in seating. With the seat rigidly locked in the body, it is not free to float and is not self-centering. There is no compensation for seal wear and thermal cycling, and the disc is not self-locking in the closed position.

U.S. Pat. No. 4,505,290, Scobie, issued Mar. 19, 1985, is directed to a valve seat assembly known as the K-Lok design. This seat, which is not fully protected during flow, has an internal metal backing ring and a set of stainless steel wire windings below the resilient part, which allows axial flexibility in both directions. During disc closing, the wire provides circumferential stiffness. To be effective, this seat design requires 25 to 30 wraps of very small diameter, stainless steel wire. Failures have been attributed to corrosion of this wire which is exposed to the working fluid. The wire is susceptible to corrosion due to its small area of cross-section relative to its surface area.

U.S. Pat. Nos. 4,487,216, Barker et al, issued Dec. 11, 1984, and 4,513,946, Priese, issued Apr. 30, 1985, are directed to butterfly valves having an off-centered stem and disc design. This design offers the advantage of a camming action when the valve is being closed or opened. This avoids rubbing between disc and seat until the valve is nearly closed, reducing wear. However, it can also substantially increase or decrease the operating torque depending on the magnitude and direction of the pressure differential and the extent of the offset.

Other sealing and valve designs are disclosed in U.S. Pat. Nos. 4,195,815, Stager, issued Apr. 1, 1980, and 4,272,054, Zinnai, issued Jun. 9, 1981.

A need has been identified for an improved butterfly valve seat design which overcomes the problems associated with the prior art.

SUMMARY OF THE INVENTION

Accordingly, an object of the present invention is to provide an improved valve seat design which, when placed under tension when in contact with the valve, the seat automatically springs back, providing tightness even at low pressures.

Accordingly, it is an aspect of the present invention to provide in a valve having a valve body, an axial flow passageway, a valving member retained within the valve body and pivoted about an axis transverse to the passageway between an open and closed position for interrupting fluid flow through the valve, an annular groove in the valve body communicating with the passageway, and a fire-safe sealing means for providing a fluid seal between the valving member and the passageway interior surface, the improvement comprising, in the fire-safe sealing means, the combination of a seating groove extending axially from the annular groove; a seal disposed in the annular groove and having an axial projection for retaining the seal in the groove and having a sealing surface projecting radially inwardly therefrom into the passageway, the sealing surface being engageable by the peripheral sealing surface of the valving member, the sealing surface having an inverted resilient J-shaped portion in cross-section, the seal having a circumferential slot for receiving a metal ring for circumferential stability; a retaining ring, the ring having a blocking groove extending axially and inwardly thereof for receiving the distal end of the resilient J-shaped portion; and an annular fire-resistant seat disposed between the seal ring and the retaining ring, the annular fire-resistant seat extending radially inwardly around the seal ring and J-shaped portion to abut the peripheral sealing surface of the valving member when the valving member is in a closed position.

BRIEF DESCRIPTION OF THE DRAWINGS

The invention will be better understood by an examination of the following description, together with the accompanying drawings, in which.

DESCRIPTION OF THE PREFERRED EMBODIMENTS

Figure 1:
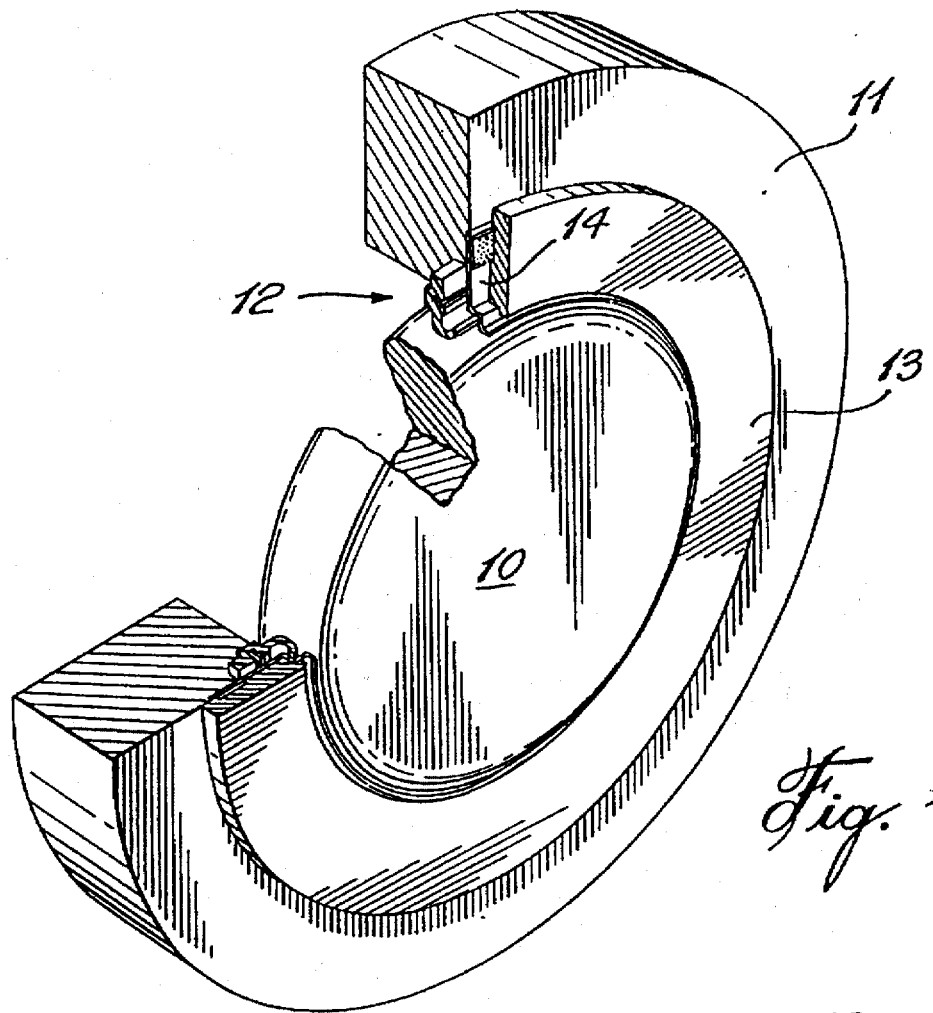
FIG. 1 is a partially cutaway perspective view of the butterfly valve of the present invention.

Referring now to FIG. 1, there is shown a butterfly valve with the seal design of the present invention, wherein the valving member or disc 10 is shown in the closed position. The seal assembly 12 is retained in an annular groove of the valve body 11 by means of a retaining ring 13 and a fire-safe seat 14.

Figure 2:
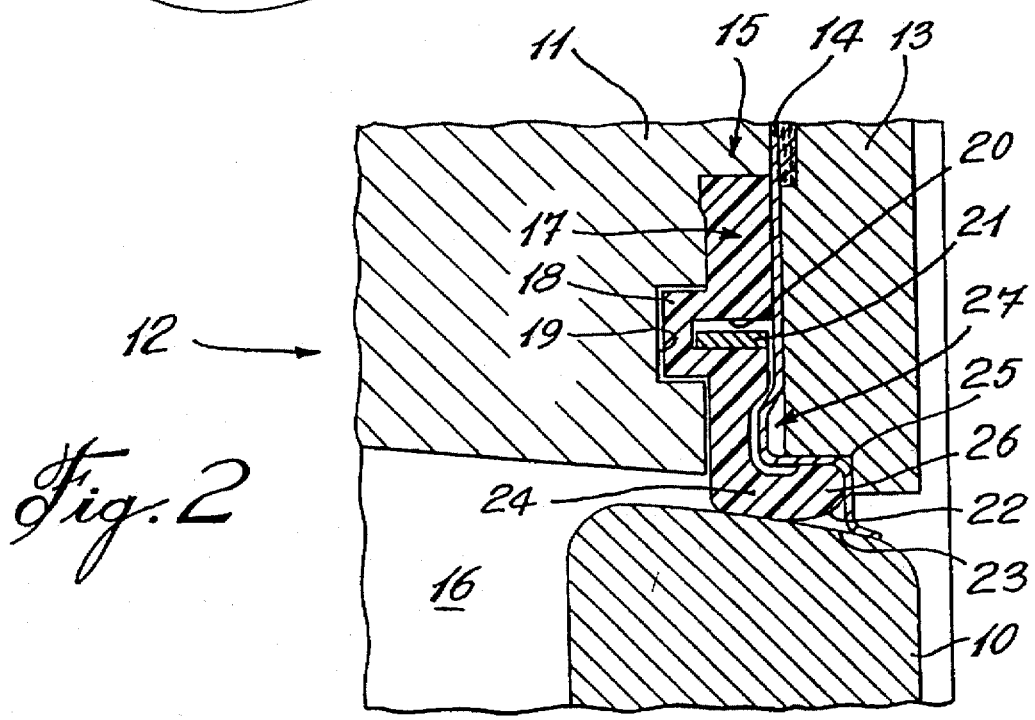
FIG. 2 is a sectional view of the seal design used with the butterfly valve shown in FIG. 1.

A better view of the seal assembly 12 is provided with reference to FIG. 2.

As indicated earlier, the valve body 11 is provided with an annular groove 15 which communicates with the passageway 16 defined in the valve body 11. The seal assembly 12 is provided with a Teflon (PTFE) seal ring 17 which is disposed in annular groove 15 of valve body 11. Seal ring 17 is provided with a transverse projection 18 adapted to fit in an annular seating groove 19 extending axially of annular groove 15. Seating groove 19 in combination with transverse projection 18 enables the Teflon seal ring 17 to be loosely retained within annular groove 15, during the opening and closing of disc 10.

The seal ring 17 is provided with an annular slot 20 extending axially at the level of the projection 18, for receiving a metal ring 21. Metal ring 21 is used for containing the seal ring 17 in the radial direction. The seal ring 17 has an inverted resilient J-shaped portion 24 in cross-section provided with a sealing surface 22 which projects radially inwardly of the seal ring into passageway 16. The sealing surface 22 is adapted to engage the sealing surface 23 of valve disc 10.

Retaining ring 13 is provided with a blocking groove 25 extending axially and inwardly thereof for receiving the distal end 26 of the resilient J-shaped portion 24. Fire safety is provided by means of annular fire-resistant seat 14 which is disposed between the Teflon seal 17 and retaining ring 13. The annular fire-resistant seat 14 extends radially inwardly to contour the sealing ring and J-shaped portion thereof, in order to abut the peripheral sealing surface 23 of disc 10 when the disc is in its closed position. In the event of fire, when heat will destroy the Teflon seal ring 17, the stainless steel seat 14 is used as a back-up to provide acceptable bi-directional leakage resistance.

As the valve closes, the peripheral sealing surface 23 of disc 10 glides into the seal at a shallow angle of approach, thereby slightly distending the sealing surface 22 of the inverted resilient J-shaped portion 24 of Teflon seal ring 17. The contact pressure developed between the sealing surface 22 of Teflon seal 17 and peripheral sealing surface 23 of the disc is moderate due to the flexibility of the open arch-like cross-section 27 of Teflon seal 17. Thus, as the peripheral sealing surface 23 engages the sealing surface 22, the inverted resilient J-shaped portion 24 will bend slightly inwardly and increase the contact surface area between the two sealing surfaces.

Because of this flexibility, the stresses in the seal ring are low; hence there is no loss of restoring force and seal contact pressure due to creep. The seal, therefore, returns to its original state when the valve disc 10 is open.

Metal ring 21, other than supporting the seal ring 17, provides additional elasticity during the opening and closing of valve disc 10.

Figure 3:
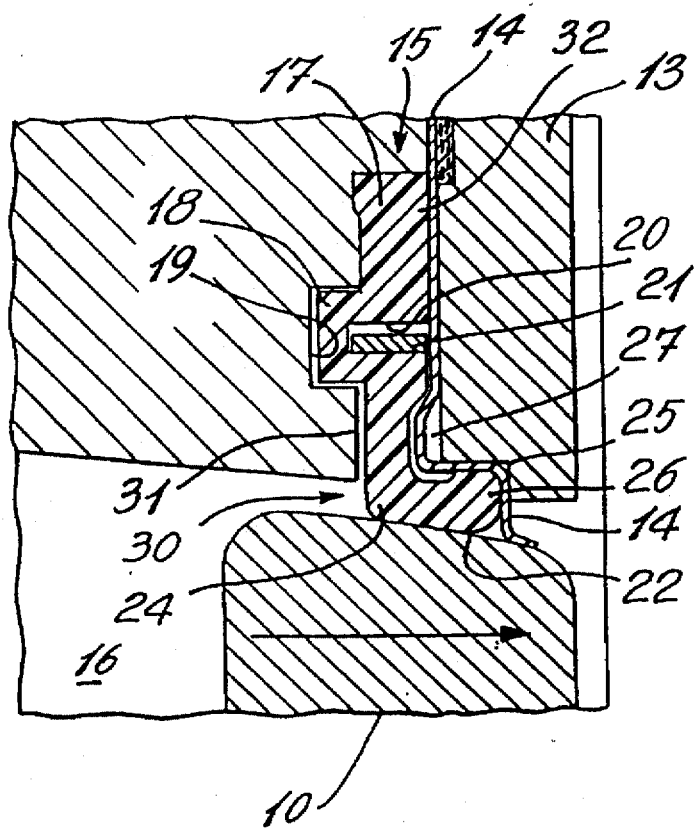
FIG. 3 is a sectional view of the seal design of the present invention showing the effects of an upstream pressure flow.
Figure 4:
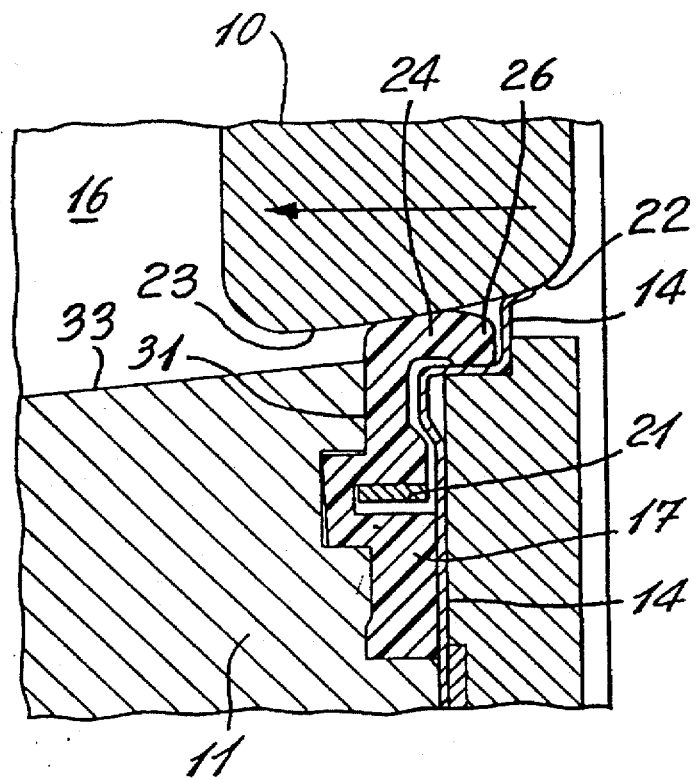
FIG. 4 is a sectional view of the seal design of the present invention showing the effects of a downstream pressure flow.

With reference to FIGS. 3 and 4, it can be seen that when one side of the valve is pressurized, high pressure fluid enters the sealed cavity which is formed in the annular groove 15 between retaining ring 13 and valve body 11. As the fluid enters, it pushes the seal ring 17 against the opposite wall of the cavity and radially inwardly against the peripheral sealing surface 23 of valving disc 10.

Thus, in the cross-section of FIG. 3, a high pressure fluid directed upstream of the valve enters the fluid cavity at a region generally illustrated by reference numeral 30, between seal ring 17 and the inner wall 31 of annular groove 15. The high pressure fluid entering at region 30 will force the distal end 26 of the resilient J-shaped portion 24 against the fire-resistant seat 14 and blocking groove 25, thus improving the sealing function of seal ring 17 even further. Blocking groove 25 in combination with fire-resistant seat 14 prevents the seal from being severely distorted under extreme pressure.

Similarly, as shown in FIG. 4, when the valve is pressurized downstream, a high pressure fluid enters the sealed cavity between the fire-resistant seat 14 and the distal end 26 of seal ring 17. The high pressure fluid thus pushes the seal ring 17 against the inner wall 31 of valve body 11 and similarly against the peripheral sealing surface 23 of disc 10. With pressure in this direction, the high pressure fluid entering the cavity also compresses the resilient J-shaped portion 24 against the inclined peripheral surface 23 which, as shown, extends outwardly of the disc towards the inner surface 33 of valve body 11.

Variations of the particular embodiment herewith described will be obvious to one skilled in the art, and accordingly, the embodiment is to be taken as illustrative rather than limiting, the true scope of the invention being set out in the appended claims.

I claim:

1. In a valve having a valve body defining an axial flow passageway, a valving member retained within said valve body and pivoted about an axis transverse to said passageway between an open and closed position for interrupting fluid flow through said valve, an annular groove in the valve body communicating with the passageway, and a fire-safe sealing means for providing a fluid seal between said valving member and said passageway interior surface, the improvement comprising, in said fire-safe sealing means, the combination of:

a seating groove extending axially of said annular groove;

a seal ring, disposed in said annular groove and having an axial annular projection for seating said sealing ring in said seating groove and having a sealing surface projecting radially inwardly therefrom into said passageway, said sealing surface being engageable by the peripheral sealing surface of said valving member, said sealing surface having an inverted resilient J-shaped portion in cross-section, said seal ring having a slot for receiving a metal ring for retaining said seal ring in the circumferential direction;

a retaining ring for retaining said seal ring in said annular and seating grooves, said ring having a blocking groove extending axially and inwardly thereof for receiving the distal end of said resilient J-shaped portion; and an annular fire-resistant seat disposed between said seal ring and said retaining ring, said annular fire-resistant seat extending radially inwardly around said seal ring and J-shaped portion to abut the peripheral sealing surface of said valving member when said valving member is in a closed position.

2. A valve seal as defined in claim 1, wherein said seal ring is loosely fitted in said annular groove, such that when one side of the valve is pressurized, high pressure fluid can enter a seal cavity formed between said seal retaining ring and said annular groove such that the seal can be pushed against the opposite wall of the cavity and radially inwardly against the peripheral sealing surface of the valving member.

3. A valve as defined in claim 2, wherein said peripheral sealing surface of said valving member is provided with a camber to enable said resilient J-shaped portion to exert additional pressure against said peripheral sealing surface of said valving member when said high pressure fluid enters said cavity.

4. A valve as defined in claim 3, wherein said flat metal ring extends in said slot of said sealing ring and into said seating groove extending axially of said annular groove.

* * * * *